(12) United States Patent
Hoogland

(10) Patent No.: US 7,686,610 B2
(45) Date of Patent: Mar. 30, 2010

(54) MOLD AND METHOD FOR THE MANUFACTURE OF HOLDERS SUCH AS TUB-SHAPED CONTAINERS

(75) Inventor: Hendricus Antonius Hoogland, Krommenie (NL)

(73) Assignee: Fountain Patents B.V., LC Cappelle Aan Den Ijssel (NL)

( * ) Notice: Subject to any disclaimer, the term of this patent is extended or adjusted under 35 U.S.C. 154(b) by 345 days.

(21) Appl. No.: 10/533,939

(22) PCT Filed: Nov. 4, 2003

(86) PCT No.: PCT/NL03/00765

§ 371 (c)(1),
(2), (4) Date: Jul. 1, 2005

(87) PCT Pub. No.: WO2004/041508

PCT Pub. Date: May 21, 2004

(65) Prior Publication Data

US 2006/0018991 A1     Jan. 26, 2006

(30) Foreign Application Priority Data

Nov. 5, 2002    (NL) .................................... 1021837

(51) Int. Cl.
*B29C 45/64* (2006.01)
(52) U.S. Cl. ........................ 425/575; 425/388; 425/385; 425/405.2
(58) Field of Classification Search ................. 425/292, 425/555, 575, 346, 355, DIG. 127, 388, 395, 425/403, 412, 414, 422, 393, 436, 438, 405.2, 425/595

See application file for complete search history.

(56) References Cited

U.S. PATENT DOCUMENTS

| 3,632,729 | A | * | 1/1972 | Bielfeldt | 264/294 |
| 3,660,002 | A | * | 5/1972 | Morroni | 425/437 |
| 3,692,456 | A |   | 9/1972 | Foster |  |
| 3,846,526 | A | * | 11/1974 | Wade | 264/46.8 |
| 3,868,893 | A | * | 3/1975 | Sutch | 425/129.1 |
| 3,942,755 | A | * | 3/1976 | Robinson | 425/589 |
| 4,442,061 | A | * | 4/1984 | Matsuda et al. | 264/328.7 |
| 4,647,274 | A | * | 3/1987 | Oda | 425/556 |

(Continued)

FOREIGN PATENT DOCUMENTS

BE           559392          8/1957

(Continued)

*Primary Examiner*—Yogendra Gupta
*Assistant Examiner*—Thu Khanh T Nguyen
(74) *Attorney, Agent, or Firm*—Hoffmann & Baron, LLP

(57) ABSTRACT

The invention relates to a mold for the manufacture of holders, comprising at least two mold halves moveable relatively to each other in a first direction of movement and a mold cavity, the mold cavity, the mold being substantially defined by a female part and a matching male part, while at least the female part and/or the male part is arranged so as to be moveable such that within the mold, the male part and/or the female part can be brought into a first position wherein between a forward end, facing, in a first direction of movement, towards the mold cavity, and an opposite bottom part of the female part, there is a relatively large, first distance, and a second position wherein between said forward end and said bottom part there is relatively small second distance.

26 Claims, 4 Drawing Sheets

U.S. PATENT DOCUMENTS

| | | | | | |
|---|---|---|---|---|---|
| 4,822,553 | A | * | 4/1989 | Marshall | 425/438 |
| 5,225,213 | A | * | 7/1993 | Brown et al. | 425/292 |
| 5,304,050 | A | * | 4/1994 | Vismara | 425/554 |
| 5,800,759 | A | * | 9/1998 | Yamazaki et al. | 425/590 |
| 6,558,589 | B1 | * | 5/2003 | Bergman | 425/595 |

FOREIGN PATENT DOCUMENTS

| | | |
|---|---|---|
| DE | 43 06 973 A1 | 8/1994 |
| DE | 100 51 843 A1 | 4/2002 |
| EP | 1 314 534 A2 | 5/2003 |
| WO | WO 90/14207 | 11/1990 |

* cited by examiner

MOLD AND METHOD FOR THE MANUFACTURE OF HOLDERS SUCH AS TUB-SHAPED CONTAINERS

This application is the U.S. National Phase of International Application Number PCT/NL2003/000765 filed on 4 Nov. 2003, which is incorporated herein by reference.

BACKGROUND OF THE INVENTION

The invention relates to a mold for the manufacture of holders. The invention further relates to a method for the manufacture of holders.

As a rule, when holders such as tub-shaped containers are injection molded, a mold is used wherein plastic is forced from the bottom surface into a longitudinal wall. With small wall thicknesses and/or long flow paths and/or a large projected surface and/or low melt plastics, particularly high closing pressures and injection pressures need to be used, particularly if a multi-cavity mold is used. As a result thereof, especially bottom surfaces of such holders are of relatively thick design.

SUMMARY OF THE INVENTION

The invention contemplates a mold for manufacturing holders with which, with relatively low closing pressure and/or low injection pressure, relatively thin-walled holders can be injection molded. To that end, a mold according to the invention is characterized by at least two mold halves moveable relative to each other in a first direction of movement and a mold cavity, the mold cavity being substantially defined by a female part and a matching male part, while at least the female part and/or the male part is arranged so as to be moveable such, that within the mold, the male part and/or the female part can be brought into a first position wherein between a forward end, facing, in a first direction of movement, towards the mold cavity, and an opposite bottom part of the female part, there is a relatively large, first distance, and a second position wherein between said forward end and said bottom part there is a relatively small second distance.

By using a moveable male and/or female part, the plastic can be introduced into the mold cavity with relatively little pressure. The fact is that since the space into which the plastic is introduced is initially kept relatively large during use by creating additional space between the male and female part, initially, the plastic needs to be introduced over a smaller distance, while, moreover, the counter pressure as a result of flow resistance is relatively low. Only when the plastic has been introduced at least virtually completely, the two parts are moved relatively to each other, towards each other, so that the plastic is moved further into the mold cavity. It is preferred that the mold is closed before the plastic is introduced, so that the plastic is prevented from flowing away inadvertently.

As the above-mentioned relatively large distance is located between the forward end of the male part and the opposite bottom surface of the female part, the advantage is achieved that, in a simple manner, additional space can be created, since the distance is located approximately parallel to the closing direction of the mold, at least the ejecting direction of the ready products. Preferably, the plastic is then introduced in the space between this forward end of the male part and the opposite bottom surface of the female part, so that minimum resistance is experienced and a favorable flow pattern is provided.

It is further preferred that the distance between the male and the female part in the first position is selected such that virtually the entire volume of plastic required for the holder can be introduced into this space between the forward end of the male part and the opposite bottom surface. As a result, a particularly advantageous initial flow pattern is obtained.

With a mold according to the invention, in a particularly advantageous manner, holders can be manufactured with a truncate shape. Herein, truncate is understood to include a holder with (a) slightly inclining longitudinal wall or walls and a bottom, such as frustoconical or truncate beam-shaped, which latter has a substantially rectangular base shape with a longitudinal wall inclining substantially outwards from a bottom surface. The first-mentioned shape can, for instance, be found in cups and the like, the latter in, for instance, butter tubs, ice-cream containers and the like. However, these examples should not be construed to be limitative in any way.

With a mold according to the invention, in particular holders can be formed with a relatively thin bottom and longitudinal wall, for instance thinner than matching the melt-flow index for a similar product with conventional molding. In particular, a bottom can be obtained which is relatively thin, so that material can be economized on. Furthermore, a mold according to the invention can simply be arranged for in-mold labeling, as the pressure of the plastic upon injection is relatively low, especially when the plastic is introduced into a bottom surface which is not to be labeled.

When using a mold according to the invention for in-mold labeling, while both the bottom and the longitudinal wall or walls are to be provided with a label, it is preferred that the plastic be introduced through the part against which the label is not provided. With a customary holder, this will mean that the plastic is introduced through the male part into a bottom forming part of the mold cavity, while the label is inserted at the opposite side thereof in or over the female part. As a result, the outside of the holder is provided with a label, while damage to and displacement of the label is prevented.

With a mold according to the invention, the design of the male and female part is preferably such that in the first position and the second position, the distance between the female part and the male part substantially only varies in or near the bottom forming part of the mold cavity, between the forward end of the male part and the bottom surface of the female part. As a result, a simple mold is obtained with favorable load of the different parts.

Preferably, the male part and/or the female part is biased in the second position. As a result, it will have to be actively brought into the first position, and it will automatically be moved to the second position. A pressure member can, for instance, be used in the opposite mold part for pushing the respective male or female part into the first position. Such a pressure member can, for instance, be a stripping plate or stripping ring or the like, which can also be used for forcing a ready product off the male part or from the female part. The respective part, biased in the second position, is preferably biased in the second position by simple spring means, for instance a gas filled spring means. In a further advantageous embodiment, during use, the respective part, biased in the second position, is moved by the injection pressure of the plastic to the first position and only when the injection pressure falls is it pushed back to the second position by the spring means or the like.

In an alternative embodiment, naturally, also the respective biased male and/or female part can, conversely, be biased in the first position and, with the aid of drive means such as a screw spindle, piston-cylinder assembly or the like, be moved to the second position so that, for instance, more pressure can be obtained or a more controlled, for instance, faster or more uniform pressure build-up can be obtained.

With multi-cavity molds according to the invention, the advantages of lower injection pressure and, in particular, lower closing pressure are achieved to an even larger extent.

The invention further relates to a method for manufacturing holders and such hollow products characterized the steps of bringing a male and/or female part to a position moved backwards, while or whereupon plastic is introduced into the mold cavity, whereupon the male part and/or the female part is brought to a position moved forward, while forcing at least a part of the plastic away such that the entire mold cavity is filled, while in the position when moved backwards, between a forward end of the male part in the direction of movement and a bottom of the female part, there is a larger distance than in the position when moved forward, while the distance between the remaining parts of the male and female part remains virtually the same.

With such a method, thin-walled products can be manufactured rapidly and with low pressures. Such a method can be particularly advantageously used for in-mold labeling products, for multiple products and for products with specific properties such as transparency, or from special materials for instance low melt plastics such as PET, PC and the like, or crystalline plastics, in particular when these are to be, become and/or remain transparent. PET is a clear but non-limitative example thereof too.

BRIEF DESCRIPTION OF THE DRAWINGS

Further advantageous embodiments of a mold and method, and of holders to be obtained therewith are given in the subclaims. In clarification of the invention, as example, exemplary embodiments of a mold, method and holder according to the invention will be further elucidated with reference to the drawing. In the drawing:

DETAILED DESCRIPTION OF THE INVENTION

Figure 1:
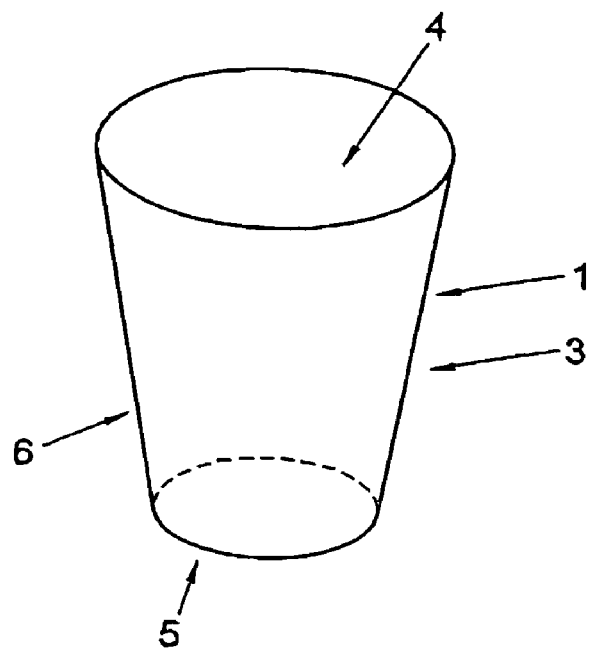
FIGS. 1 and 2 show a frustoconical and a truncate beam-shaped holder according to the invention.

In this description; identical or corresponding parts have identical or corresponding reference numerals. As examples of holders according to the invention a cup and a butter tub are given, as frustoconical holder and as truncated beam-shaped holder. Naturally, many different shapes can also be manufactured according to the invention with a mold according to the invention.

Figure 2:
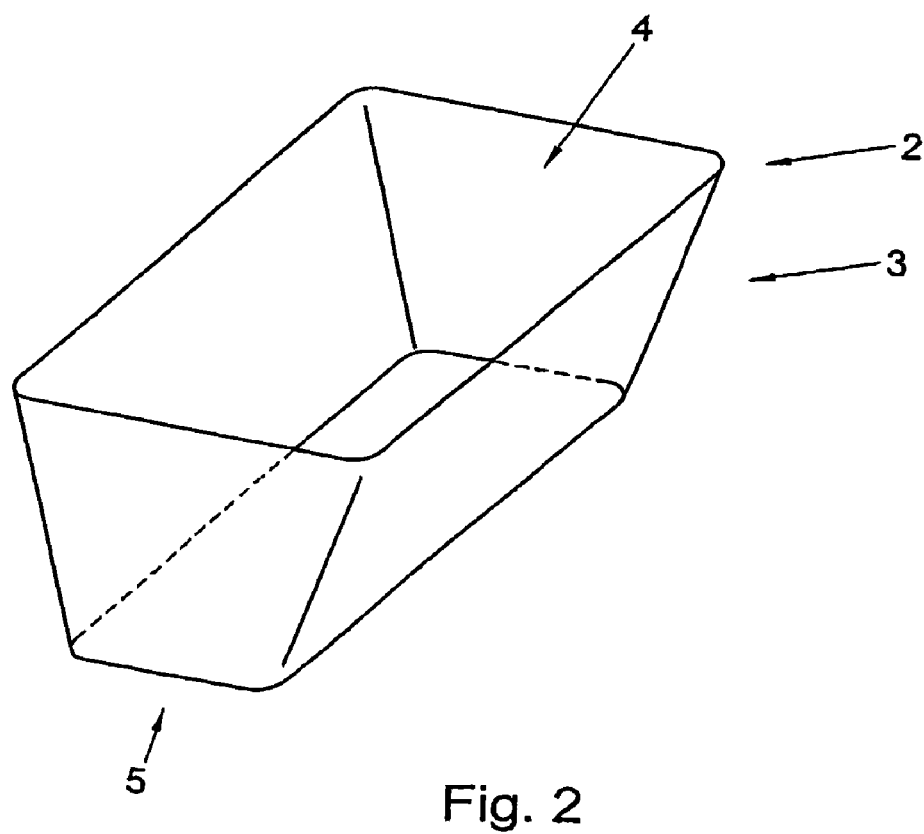

FIG. 1 shows a cup 1, FIG. 2 a butter tub 2. Both are holders 3 with a relatively small wall thickness, for instance some tens of millimeters, and have an internal space 4 which is relatively large. The holders 3 are relatively high in relation to the wall thickness. Preferably, the bottoms 5 of these holders 3 have a thickness which is approximately equal to or smaller than the wall thickness of the walls 6. However, these thicknesses can be selected to be different and can, for instance, also taper over the wall and/or bottom. The holders can be transparent, opaque or completely non-transparent.

Figure 3:
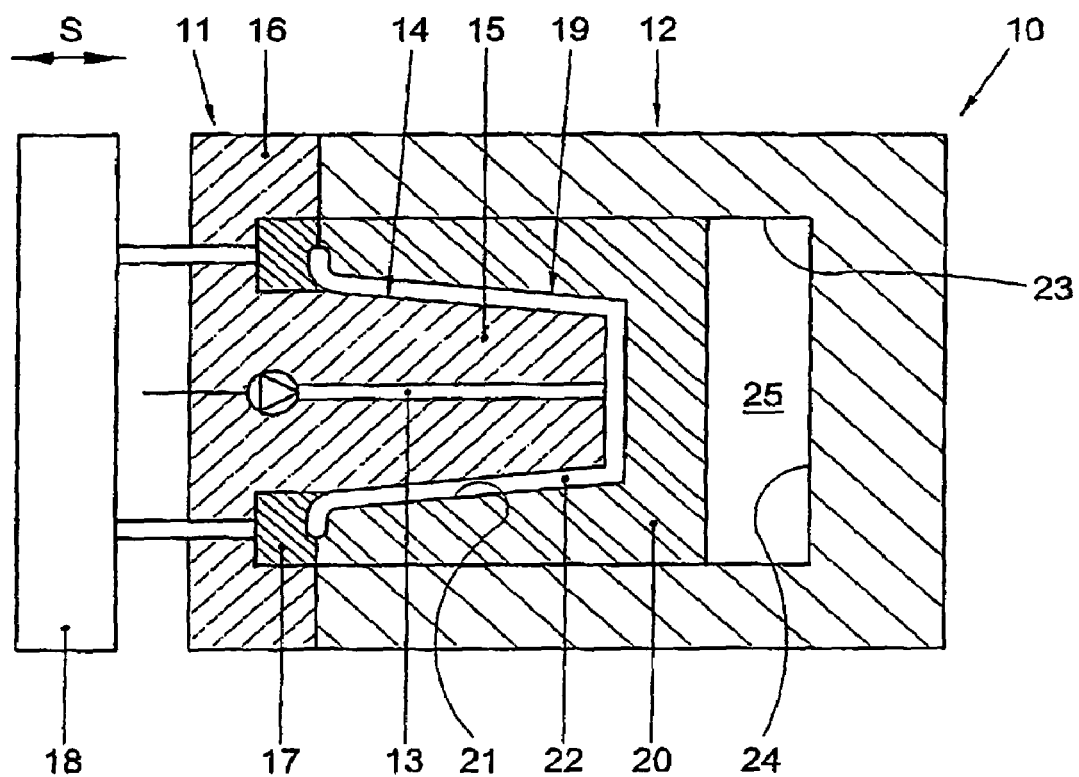
FIG. 3 shows, in cross-sectional side view, a part of a first embodiment of a mold according to the invention.

In FIG. 3, schematically, a mold 10 is shown for forming a holder, for instance according to FIG. 1 or 2. This mold 10 comprises a first part 11 and a second part 12, moveable relative to each other. In the exemplary embodiment shown, the second part can be moved actively, as will be elucidated further with reference to FIG. 4, for opening and closing the mold. A supply device 13 is provided in the first part 11.

The first part 11 comprises a male part 14, which is substantially formed by a frustoconical or truncate block-shaped part 15, fixedly connected to a first base plate 16. In the base plate 16, a stripper ring 17 or such pressure means is provided which extends around the wide end of the part 15 and is moveable in the direction S with the aid of an ejector plate 18. In the position shown in FIG. 3, the ejector plate 18 and hence the stripper ring 17 are shown in a retracted, second position.

The second part 12 comprises a female part 19, which is substantially formed by a block 20 having a cavity 21 therein which corresponds as to shape to that of part 15 and has dimensions such that, as shown in FIG. 3, with the mold 10 in the closed position and the stripper ring 17 retracted, between the male part 14 and the female part 19, a mold cavity 22 is left open, at least defined which has, substantially, the shape of the desired holder S. The block 20 is included in, for instance, a cylindrical space 23 in the second part 12, in which it can be shifted in the direction S. Between the end of the block 20 facing away from the first part 11 and the closed end 24 of the space 23, a chamber 25 is formed, filled with, for instance, gas or oil or a similar medium for forming a pressure chamber. Upon movement of the block 20 in the direction of this end 24, in the chamber 25, an increased pressure will occur, biasing the block 20 in the direction of the first part 11 and hence in the direction of the second position shown in FIG. 3.

In this mold 20, a holder 3 can be formed by introduction of plastic in substantially liquid, at least, moldable form. To that end, steps can be traversed as shown in FIGS. 4A-C.

Figure 4C:
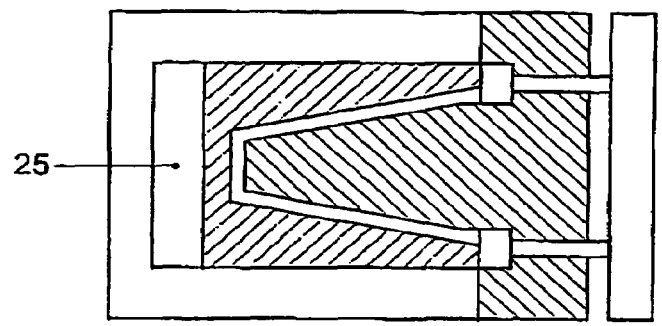
FIGS. 4A-C schematically show, in cross sectional side view, a mold according to the invention, in three steps of a method according to the invention.
Figure 4B:
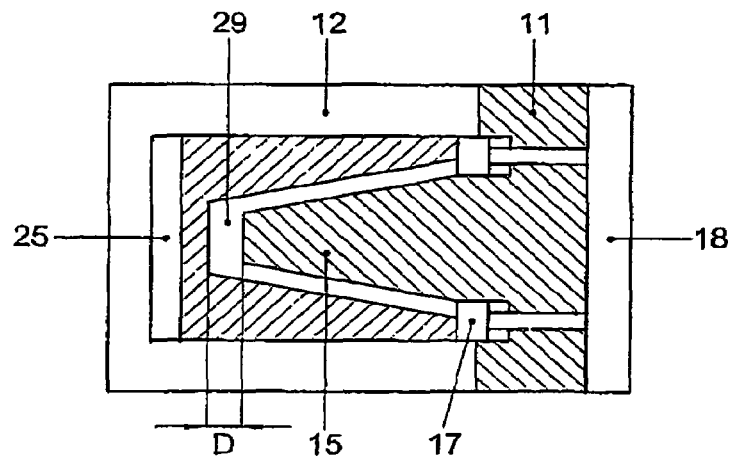
Figure 4A:
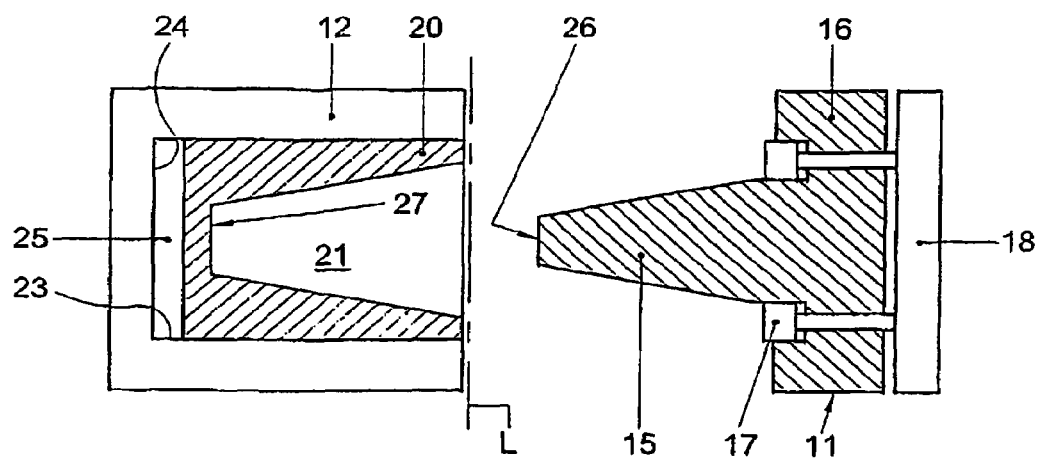

In FIG. 4A, the mold 10 is shown in opened condition. The block 20 has been pushed by the medium into the chamber 25 into the second position, maximally forward (towards the right in FIG. 4). The stripper ring 17 in the first part 11 is moved outwards (towards the left in FIG. 4) with the aid of the ejector plate 18.

In FIG. 4B, the mold 10 is shown in closed condition. The stripper ring 17 is held in the position moved in outwards direction, shown in FIG. 4A. The stripper ring 17 then abuts against the block 20, so that the block 20 is moved backwards, in the direction of the end 24, thereby reducing the volume of the chamber 25 and compressing the medium therein. As a result, pressure is exerted on the stripper ring 17. FIG. 4B shows the second position. As clearly appears from FIG. 4B, the foremost end 26 of the male end 15 (facing the left in FIG. 4) is at a relatively large distance D from the bottom surface 27 of the cavity 21. This distance D is, in particular, larger than the distance between the male part 15 and the wall of the cavity 21 in the female part 19. Between this end 26 and the bottom surface 27, a bottom forming space 29 is formed into which the plastic is introduced via the supply means 13 (not shown in FIG. 4). In the second position, shown in FIG. 4B, the volume of the bottom forming space 29 is relatively large, for instance approximately equal to the volume of material required for the entire holder. Consequently, the plastic can be introduced into the mold cavity 22 rapidly and in a simple manner, with little counter pressure.

After the plastic has been, at least for the larger part, introduced into the mold cavity 22, at least in the bottom forming cavity thereof, the ejector plate is moved backwards (to the right in FIG. 4), to a first position as shown in FIG. 4C. The stripper ring 17 is then no longer retained (or actively pulled back) so that the block 20 can be pushed by the medium into the chamber 25 to the first position (to the right in FIG. 4C). The bottom forming space 29 is then considerably reduced.

The distance D1 between the end 26 and the bottom surface 27 is reduced to the desired wall thickness, for instance equal to the wall thickness of the wall 6 of the holder. The plastic is then pressed, for the larger part, from the bottom forming space 29, between the male part 15 and the wall of the cavity 21, for completely filling the mold cavity 22 and hence forming the desired product 3.

After the holder 3 has been formed and, optionally, has cooled down, the mold can be opened again to the position shown in FIG. 4A, while the ejector plate 18 and hence the stripper ring 17 are moved forwards, thereby forcing the ready product from the male part 15.

Figure 5:
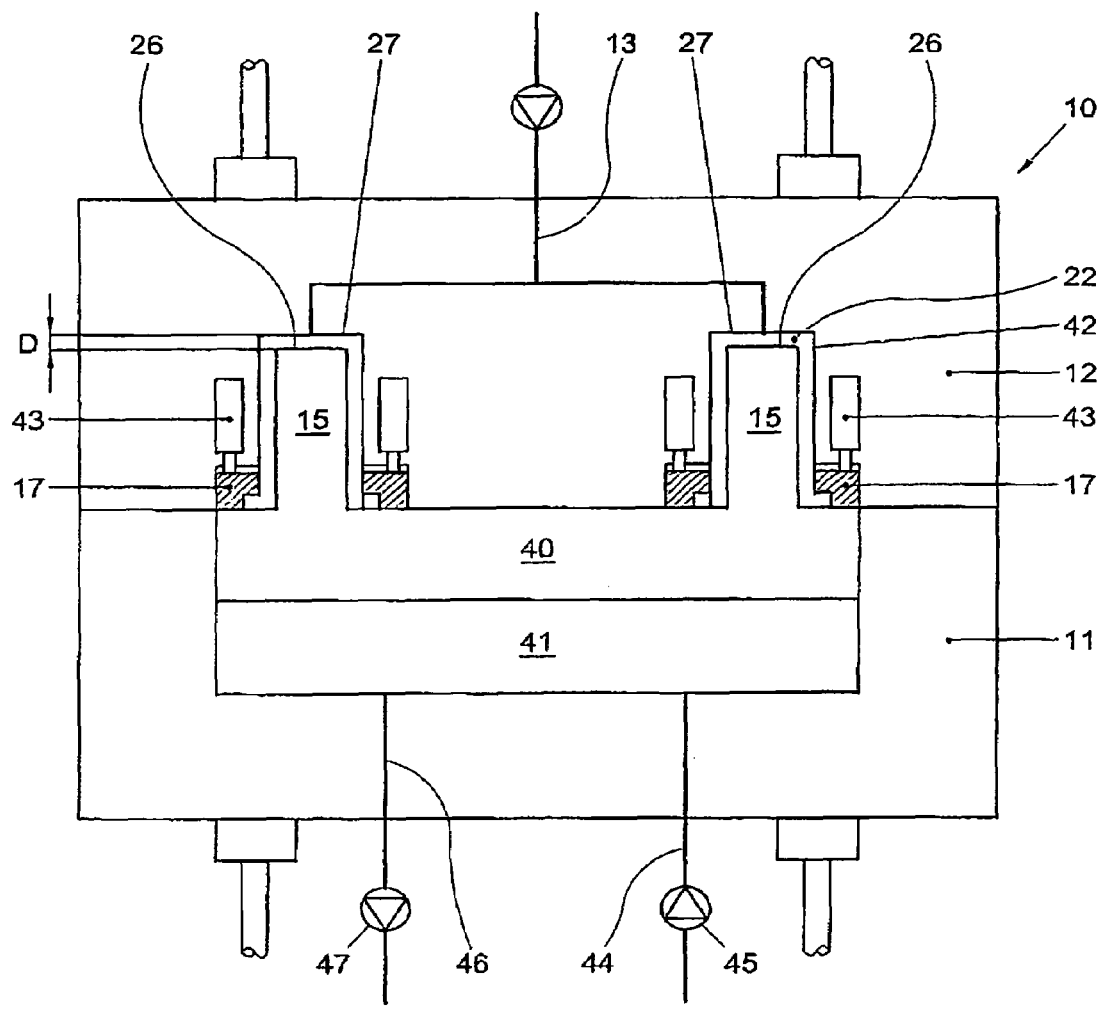
FIG. 5 schematically shows, in cross-sectional side view, a mold according to the invention, in an alternative embodiment.

In FIG. 5, schematically, an alternative embodiment of a mold 10 according to the invention is shown, wherein two male parts 15, having a substantially cylindrical or slightly conical shape, are attached to a moveable base plate 40, which base plate 40 is moveable in a chamber 41 formed in the first part 11 of the mold 40. In the second part 12, fixed cavities 42 are provided with stripper rings 17 around them, biased in the direction of the base plate 40 by springs 43. Supply means 13 terminate in the cavities 42 through the second part 12. A supply duct 44 with pressure pump 45 and a discharge duct 46 with a suction pump 47 open into the chamber 41, so that the pressure in the chamber 41 can be actively regulated. With this, it can be regulated whether the stripper rings 17, under the influence of the springs 43, can force the base plate 40 with male parts 15 backwards in the direction away from the second part 12 or not, or the base plate can be actively withdrawn from the second part or, conversely, be moved thereagainst. With this, each time, the distance D between the end 26 of the male parts 15 and the bottom surface 27 of the cavities 21 can be set. Also, the pressure in the chamber 41 can be set to be such that, due to the pressure of the plastic flowing into the mold cavities 22, the base plate can be pushed away and only be moved back if the injection pressure falls after all plastic has been introduced. Optionally, the springs can then be omitted or be replaced by controlled gas springs with which the stripper rings 17 can be actively moved for ejecting the holders and/or abutting against the base plate 41.

Before the mold 10 is closed, a label can be inserted, for instance over or in the cavity 21 or on the male part 15, for in-mold labeling. In FIG. 4A this is symbolically shown by the chain-dotted line L.

Naturally, all combinations of parts of molds according to the invention can be used.

The invention is not limited in any manner to the embodiments as shown and described. Many variations thereon are possible within the framework of the invention. Naturally, the pump 45 and 47 can be combined in a double acting pump.

For instance, other means can be used for bringing and/or holding a moveable male part and/or a female part in the first and/or second position, such as screw spindles, piston-cylinder assemblies, electric magnets and such means known per se. Other numbers of mold cavities can be provided, single or stack molds. The movements of moving parts can be actively controlled. All sorts of other shapes of holders can be formed with a mold or method according to the invention.

These and many comparable variations are understood to fall within the framework of the invention.

The invention claimed is:

1. An injection mold for injection molding holders, comprising at least a first and a second mold half moveable relative to each other in a first direction of movement, a mold cavity and an injection inlet opening for injecting a substantially liquid plastic into the mold cavity, the mold cavity being substantially defined by a female part and a matching male part, while at least the female part and/or the male part is arranged so as to be moveable such that, within the mold, the male part and/or the female part can be brought into a first position wherein between a forward end, facing, in a first direction of movement, towards the mold cavity, and an opposite bottom part of the female part, there is a relatively large, first distance, and a second position wherein between said forward end and said bottom part there is a relatively small second distance, wherein a pressure chamber is defined between the male part and the first mold half or between the female part and the second mold half, the pressure chamber containing a pressure medium therein for moving the male part and the female part from the first position into the second position.

2. A mold according to claim 1, wherein said injection inlet opening is provided in or near a space between said forward end of the male part and said bottom part of the female part.

3. A mold according to claim 2, wherein said inlet opening is provided in the male part.

4. A mold according to claim 1, wherein the male part is frustoconical and the female part has a corresponding shape, such that with the male and female part in the second position, between the two parts, there is a virtually constant distance.

5. A mold according to claim 1, wherein the male part is truncate block-shaped and the female part has a corresponding shape, such that with the male and female part in the second position, between the two parts, there is a virtually constant distance.

6. A mold according to claim 1, wherein at least the male part or the female part is biased in the second position.

7. A mold according to claim 1, wherein a pressure member is provided for actively keeping the male part and/or the female part in the first position, which pressure member is retractable for having the male and female part move from the first position to the second position.

8. A mold according to claim 7, wherein the pressure member extends around at least a part of the male part and, with the mold closed, can force, at least hold, the female part in the first position.

9. A mold according to claim 8, wherein the pressure member is designed as stripper ring.

10. A mold according to claim 1, wherein at least one moving male and/or female part is forced into the first position by spring means.

11. A mold according to claim 10, wherein the spring means are designed such that the respective male or female part can be pushed away to the first position by plastic flowing into the mold cavity, and, when the injection pressure of the plastic falls, is forced to the second position by the spring means.

12. A mold according to claim 1, wherein the male and/or the female part is arranged for movement to a product forming position after the mold has been closed.

13. A mold according to claim 1, wherein the mold is of multi cavity design, while for each mold cavity at least one moveable part is provided.

14. A mold according to claim 10, wherein the spring means are gas-filled means.

15. An injection mold for injection molding plastic holders, the mold comprising:
a first mold half including a male part;
a second mold half moveable relative to said first mold half;
a female part movable within said second mold half toward and away from said male part of said first mold half, said female part and said male part of said first mold half defining a mold cavity of variable volume therebetween, and said female part and said second mold half defining a pressure chamber therebetween;

a pressure medium contained within said pressure chamber for moving said female part toward said male part thereby reducing the volume of said mold cavity; and an injection inlet opening for injecting a substantially liquid plastic into said mold cavity.

16. An injection mold as defined in claim 15, wherein said male part and said female part are movable between a first position, wherein said mold cavity has a first volume, and a second position, wherein said mold cavity has a second volume, said first volume being greater than said second volume, and wherein said pressure medium urges said female part into said second position.

17. An injection mold as defined in claim 16, wherein said first mold half includes a movable pressure member, said pressure member extending from said first mold half to engage said female part upon closure of the mold for urging said female part into said first position, and said pressure member retracting as said pressure medium urges said female part into said second position.

18. An injection mold as defined in claim 17, wherein said pressure member is a stripper ring surrounding said male part of said first mold half.

19. An injection mold for injection molding plastic holders, the mold comprising:
  a first mold half;
  a second mold half moveable relative to said first mold half;
  a male part movable within said first mold half toward and away from said second mold half, said male part and said second mold half defining a mold cavity of variable volume therebetween, and said male part and said first mold half defining a pressure chamber therebetween;
  a pressure medium contained within said pressure chamber for urging said male part toward said second mold half thereby reducing the volume of said mold cavity; and
  an injection inlet opening for injecting a substantially liquid plastic into said mold cavity.

20. An injection mold as defined in claim 19, wherein said male part is movable between a first position, wherein said mold cavity has a first volume, and a second position, wherein said mold cavity has a second volume, said first volume being greater than said second volume, and wherein said pressure medium urges said male part into said second position.

21. An injection mold as defined in claim 16, wherein said second mold half includes a movable pressure member, said pressure member extending from said second mold half to engage said male part upon closure of the mold for urging said male part into said first position, and said pressure member retracting as said pressure medium urges said male part into said second position.

22. An injection mold as defined in claim 21, wherein said pressure member is a stripper ring surrounding said male part.

23. A holder injection mold comprising:
  at least a first and a second mold half moveable relative to each other;
  a female part;
  a male part matching said female part and, together with said female part, defining a mold cavity therebetween;
  an injection inlet opening communicating with said mold cavity;
  a pressure chamber defined between said male part and said first mold half or between said female part and said second mold half; and
  a pressure medium contained in said pressure chamber,
  wherein said female part and said matching male part are mutually movable relative to each other between a first position and a second position, the first position being defined by a first distance between opposite surfaces of said male part and said female part, and the second position being defined by a second distance between said opposite surfaces of said male part and said female part, said first distance being greater than said second distance, and
  wherein said female part or said male part are disposed within one of said first mold half and said second mold half when said female part and said male part are in said first position and also when said female part and said male part are in said second position.

24. A mold according to claim 23, wherein said first mold half integrally comprises said male part.

25. A mold according to claim 23, wherein said male part is not movable with respect to said first mold half.

26. A mold according to claim 23, wherein said female part is located in said second mold half, said female part being simultaneously movable with respect to said first mold half, said second mold half and said male part.

* * * * *